(12) United States Patent
Thomas et al.

(10) Patent No.: US 11,249,902 B1
(45) Date of Patent: Feb. 15, 2022

(54) APPARATUS, SYSTEM, AND METHOD FOR DETECTING AND REMEDYING MEMORY BUFFER LEAKS IN NETWORK DEVICES

(71) Applicant: Juniper Networks, Inc., Sunnyvale, CA (US)

(72) Inventors: Reji Thomas, Sunnyvale, CA (US); Sairam Neelam, Sunnyvale, CA (US); Vivek Ramesh, Sunnyvale, CA (US); Jimmy Jose, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 133 days.

(21) Appl. No.: 16/660,478

(22) Filed: Oct. 22, 2019

(51) Int. Cl.
*G06F 12/02* (2006.01)
*H04L 12/26* (2006.01)
*H04L 12/861* (2013.01)

(52) U.S. Cl.
CPC .......... *G06F 12/0253* (2013.01); *H04L 43/00* (2013.01); *H04L 43/0829* (2013.01); *H04L 49/9047* (2013.01); *G06F 2212/1044* (2013.01)

(58) Field of Classification Search
CPC ......... G06F 12/0253; G06F 2212/1044; H04L 43/00; H04L 43/0829; H04L 49/9047
See application file for complete search history.

(56) References Cited

U.S. PATENT DOCUMENTS

| 10,313,255 | B1* | 6/2019 | Matthews | H04L 47/31 |
| 2005/0235127 | A1* | 10/2005 | Muthiah | G06F 11/3648 711/170 |
| 2009/0285235 | A1* | 11/2009 | Kuila | H04L 69/02 370/474 |
| 2021/0026721 | A1* | 1/2021 | Wang | G06F 9/45558 |

* cited by examiner

*Primary Examiner* — Kent Krueger
(74) *Attorney, Agent, or Firm* — FisherBroyles, LLP (57) ABSTRACT

A disclosed method may include (1) identifying a memory buffer that is allocated to a packet on a computing device, (2) identifying one or more characteristics of the memory buffer allocated to the packet on the computing device, (3) determining, based at least in part on the characteristics of the memory buffer, that the memory buffer allocated to the packet has leaked, and then in response to determining that the memory buffer has leaked, (4) performing at least one action to remedy the leak of the memory buffer. Various other apparatuses, systems, and methods are also disclosed.

18 Claims, 7 Drawing Sheets

APPARATUS, SYSTEM, AND METHOD FOR DETECTING AND REMEDYING MEMORY BUFFER LEAKS IN NETWORK DEVICES

BACKGROUND

Network devices (such as routers and switches) are often used to forward traffic within a network and/or across networks. These network devices may represent and/or form the infrastructure of such networks. In some examples, an operating system running on a network device may allocate memory buffers to packets handled by the network device. If the operating system fails to free and/or release those memory buffers due to a programming error, those memory buffers may constitute and/or represent leaks in the network device.

Unfortunately, such leaks may ultimately lead to memory buffer exhaustion—a situation in which no memory buffers are available for allocation to incoming packets that arrive at the network device. As a result of this memory buffer exhaustion, the network device may effectively become unusable and/or unable to continue handling or forwarding packets. Accordingly, this memory buffer exhaustion may obstruct and/or impede the flow of traffic through the network device.

The instant disclosure, therefore, identifies and addresses a need for additional and improved apparatuses, systems, and methods for detecting and remedying memory buffer leaks in network devices.

SUMMARY

As will be described in greater detail below, the instant disclosure generally relates to apparatuses, systems, and methods for detecting and remedying memory buffer leaks in network devices. In one example, a method for accomplishing such a task may include (1) identifying a memory buffer that is allocated to a packet on a computing device, (2) identifying one or more characteristics of the memory buffer allocated to the packet on the computing device, (3) determining, based at least in part on the characteristics of the memory buffer, that the memory buffer allocated to the packet has leaked, and then in response to determining that the memory buffer has leaked, (4) performing at least one action to remedy the leak of the memory buffer.

Similarly, a system that implements the above-identified method may include a physical processor configured to execute various modules stored in memory. In one example, this system may include and/or execute (1) an identification module that (A) identifies a memory buffer that is allocated to a packet on a computing device and (B) identifies one or more characteristics of the memory buffer allocated to the packet on the computing device, (2) a determination module that determines, based at least in part on the characteristics of the memory buffer, that the memory buffer allocated to the packet has leaked, and (3) a remedy module that performs at least one action to remedy the leak of the memory buffer in response to the determination that the memory buffer has leaked.

Additionally or alternatively, an apparatus that implements the above-identified method may include at least one storage device that includes a set of memory buffers available for allocation to packets traversing a computing device. The apparatus may also include at least one physical processor communicatively coupled to the storage device. In one example, the physical processor (1) identifies a memory buffer that is allocated to a packet on a computing device, (2) identifies one or more characteristics of the memory buffer allocated to the packet on the computing device, (3) determines, based at least in part on the characteristics of the memory buffer, that the memory buffer allocated to the packet has leaked, and then (4) performs at least one action to remedy the leak of the memory buffer in response to the determination that the memory buffer has leaked.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for detecting and remedying memory buffer leaks in network devices. As will be explained in greater detail below, embodiments of the instant disclosure may examine and/or analyze certain characteristics of memory buffers allocated to packets on a computing device. For example, embodiments of the instant disclosure may tag the memory buffers with timestamps as they are allocated to those packets on the computing device. In this example, embodiments of the instant disclosure may monitor and/or track the memory buffers allocated to those packets.

Continuing with this example, embodiments of the instant disclosure may subsequently compare the timestamps to the current system time. Upon doing so, embodiments of the instant disclosure may generate time differentials and/or deltas that represent the amounts of time that has passed since the memory buffers were allocated to those packets. In one example, embodiments of the instant disclosure may determine that one or more of the time differentials and/or deltas exceed a certain time threshold.

As a result, these embodiments may determine that the allocated memory buffers to which the excessive time differentials and/or deltas correspond may constitute and/or represent leaks in the computing device. To resolve and/or remedy the memory buffer leaks, these embodiments may perform one or more actions, such as freeing or releasing the leaked memory buffers, notifying an administrator of the leaked memory buffers, and/or notifying a policy engine. Such actions may be able to prevent the computing device from reaching memory buffer exhaustion and/or becoming unusable or unable to continue handling or forwarding packets.

The following will provide, with reference to FIGS. 1, 2, and 4-6 detailed descriptions of exemplary apparatuses, systems, and corresponding implementations for detecting and remedying memory buffer leaks in network devices. Detailed descriptions of computer-implemented methods for detecting and remedying memory buffer leaks in network devices will be provided in connection with FIG. 3. In addition, detailed descriptions of an exemplary computing system for carrying out these methods will be provided in connection with FIG. 7.

Figure 1:
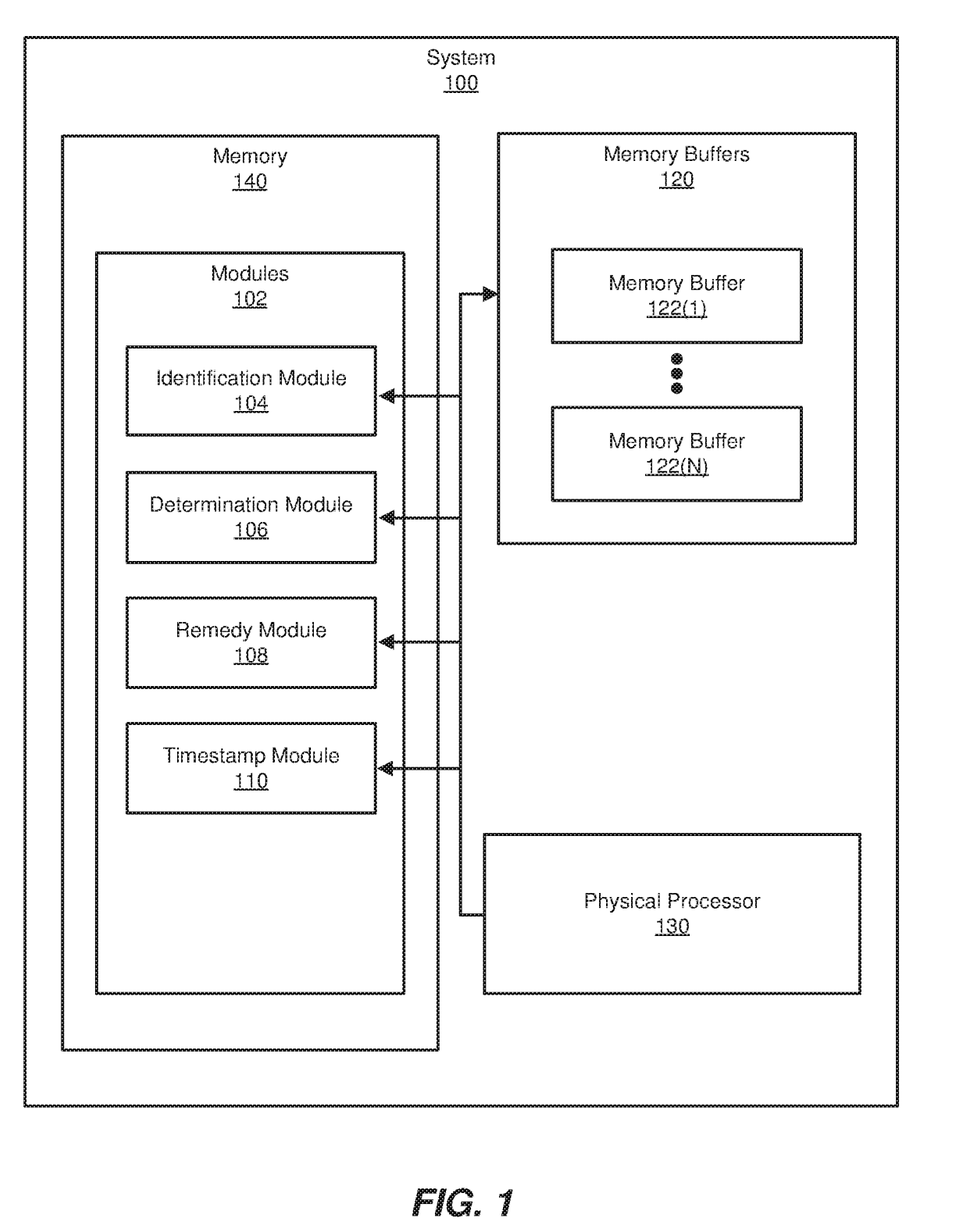
FIG. 1 is a block diagram of an exemplary system for detecting and remedying memory buffer leaks in network devices.

FIG. 1 shows an exemplary system 100 that facilitates detecting and remedying memory buffer leaks in network devices. As illustrated in FIG. 1, system 100 may include one or more modules 102 for performing one or more tasks. As will be explained in greater detail below, modules 102 may include an identification module 104, a determination module 106, a remedy module 108, and a timestamp module 110. Although illustrated as separate elements, one or more of modules 102 in FIG. 1 may represent portions of a single module, application, and/or operating system (e.g., an operating system kernel).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 208, and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting and remedying memory buffer leaks in network devices. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more memory buffers, such as memory buffers 120. In some examples, memory buffers 120 may include and/or represent memory management structures and/or data structures that are allocated to packets processed by and/or traversing a computing device. As a specific example, memory buffers 120 may include and/or represent a set of "mbuf" data structures managed by an operating system kernel.

In one example, memory buffers 120 may include and/or represent memory buffers 122(1)-(N). In this example, memory buffers 120 may be allocated and/or assigned to incoming packets and then freed and/or released once those packets have been fully processed and/or forwarded. However, if one or more of memory buffers 120 leak, such memory buffers may remain allocated and/or assigned beyond a certain amount of time without ever being freed and/or released. These memory buffer leaks may result from an unknown and/or unresolved programming error in the operating system kernel of the computing device.

Figure 2:
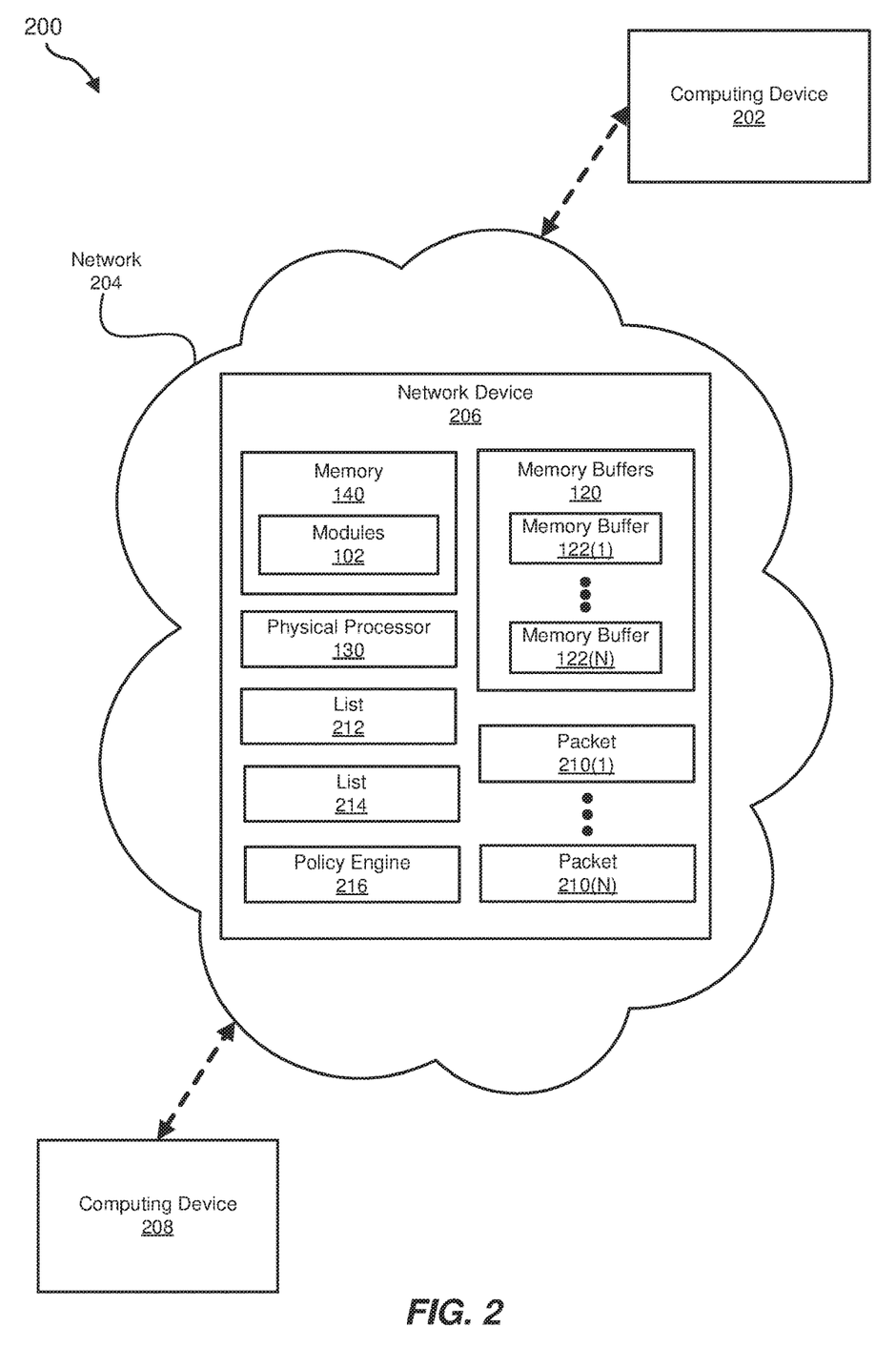
FIG. 2 is a block diagram of an additional exemplary system for detecting and remedying memory buffer leaks in network devices.

An apparatus for detecting and remedying memory buffer leaks in network devices may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication between computing devices 202 and 208.

As illustrated in FIG. 2, network 204 may include and/or represent various network devices and/or nodes that form and/or establish communication paths and/or segments. For example, network 204 may include a network device 206 that forwards traffic from computing device 202 along one or more paths toward computing device 208. In some embodiments, network device 206 may include and/or represent memory 140, physical processor 130, and/or memory buffers 120.

In some examples, and as will be described in greater detail below, one or more of modules 102 may cause network device 206 to (1) identifying memory buffer 122(1) that is allocated to a packet 210(1), (2) identifying one or more characteristics of memory buffer 122(1) allocated to packet 210(1), (3) determining, based at least in part on the characteristics of memory buffer 122(1), that memory buffer 122(1) has leaked, and then in response to determining that memory buffer 122(1) has leaked, (4) performing at least one action to remedy the leak of memory buffer 122(1).

Network device 206, computing device 202, and computing device 208 each generally represent any type or form of physical computing device capable of reading computer-executable instructions and/or handling network traffic. Examples of network device 206, computing device 202, and computing device 208 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable computing devices.

Network 204 generally represents any medium or architecture capable of facilitating communication or data transfer. In one example, network 204 may include computing devices 202 and 208 even though these devices are illustrated as being external to network 204 in FIG. 2. Additionally or alternatively, network 204 may include other devices that facilitate communication among network device 206, computing device 202, and computing device 208. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an IP network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
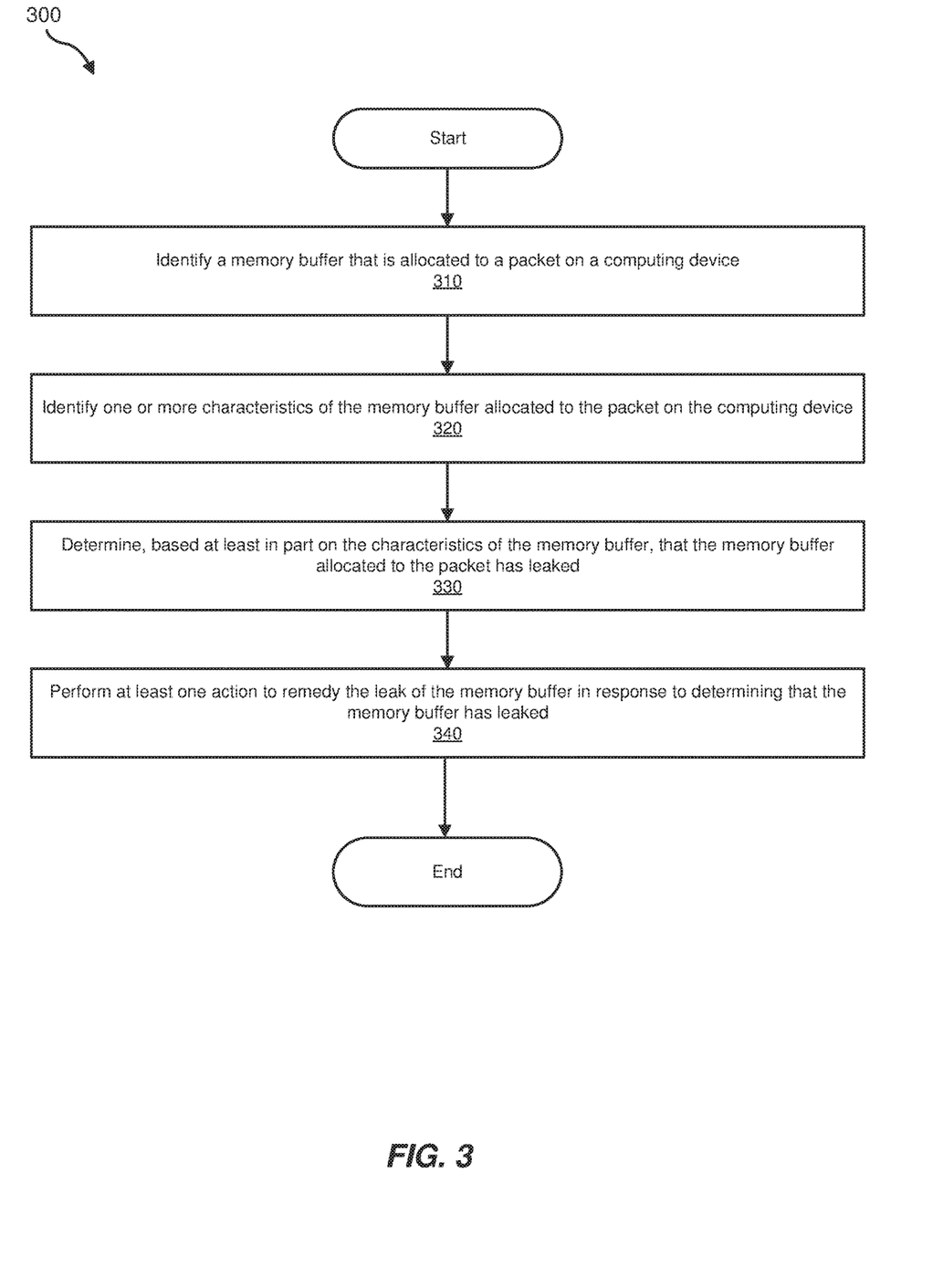
FIG. 3 is a flow diagram of an exemplary method for detecting and remedying memory buffer leaks in network devices.

FIG. 3 is a flow diagram of an exemplary computer-implemented method 300 for detecting and remedying memory buffer leaks in network devices. The steps shown in FIG. 3 may be performed by any suitable computer-executable code and/or computing system, including system 100 in FIG. 1, system 200 in FIG. 2, system 400 in FIG. 4, system 500 in FIG. 5, system 600 in FIG. 6, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a memory buffer that is allocated to a packet on a computing device. For example, identification module 104 may, as part of network device 206 in FIG. 2, identify memory buffer 122(1) that is allocated to packet 210(1). In this example, packet 210(1) may have arrived at network device 206 while traversing and/or travelling across network 204. Network device 206 may have allocated and/or assigned memory buffer 122(1) to packet 210(1) for handling, processing, and/or forwarding.

The systems described herein may perform step 310 in a variety of ways and/or contexts. In some examples, identification module 104 may identify memory buffer 122(1) as having been allocated on network device 206 based at least in part on one or more lists. These allocated memory buffers may be unavailable for further allocation and/or assignment until being freed and/or released. For example, identification module 104 may identify a list of memory buffers that are currently allocated on network device 206. In this example, the operating system kernel running on network device 206 may log and/or record each memory buffer that is currently allocated to a packet being handled, processed, and/or forwarded by network device 206. This log and/or record may be maintained and/or kept as a list 212.

Additionally or alternatively, identification module 104 may identify a list of memory buffers that are currently free on network device 206. These free memory buffers may be available for allocation and/or assignment. In this example, the operating system kernel running on network device 206 may log and/or record each memory buffer that is currently free for allocation and/or assignment by network device 206. This log and/or record may be maintained and/or kept as a list 214.

In some examples, identification module 104 may analyze list 212 to identify those memory buffers that are currently allocated on network device 206. During this analysis, identification module 104 may locate an entry for memory buffer 122(1) on list 212. Additionally or alternatively, identification module 104 may analyze list 214 to identify those memory buffers that are currently free on network device 206. During this analysis, identification module 104 may fail to locate an entry for memory buffer 122(1) on list 214.

Figure 4:
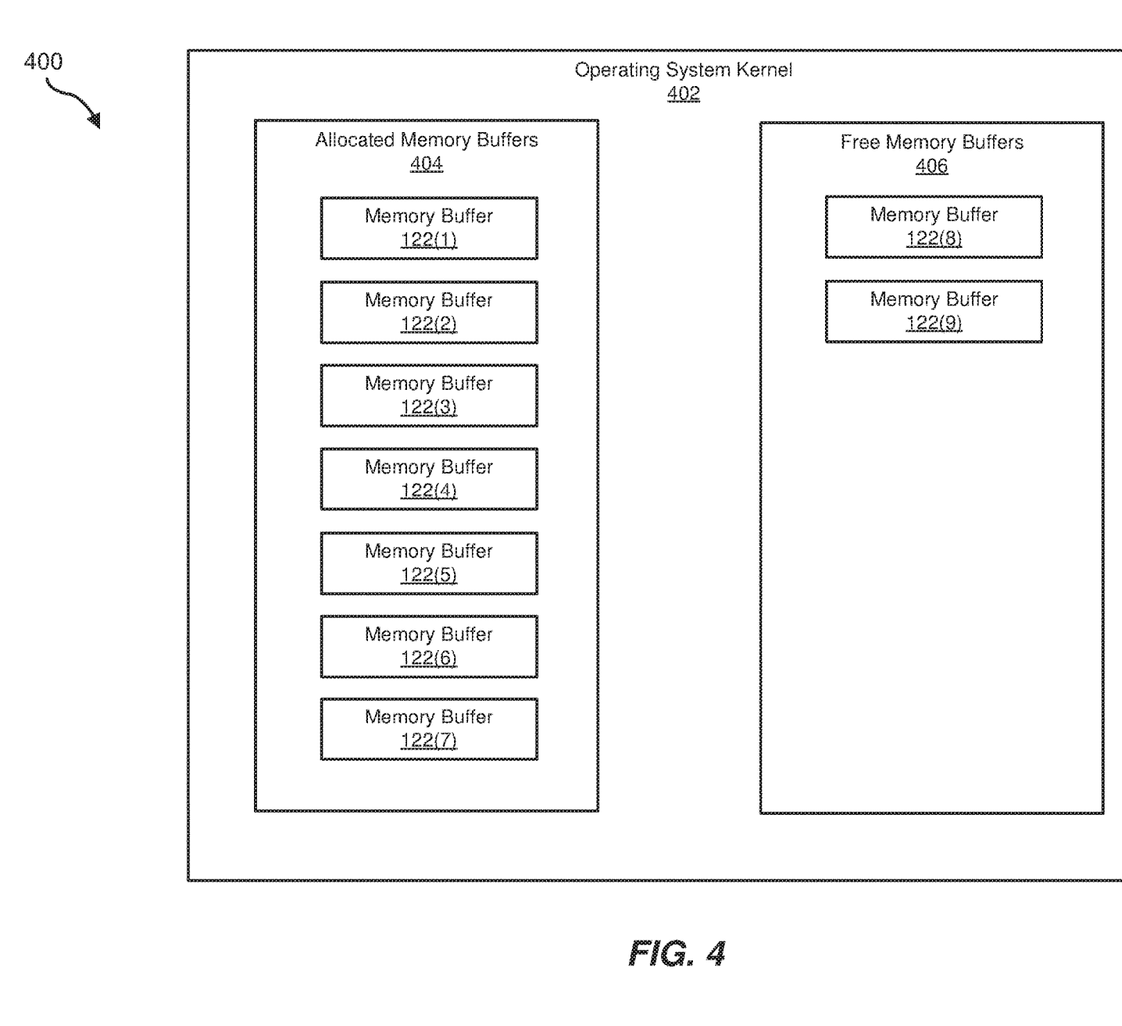
FIG. 4 is an illustration of an exemplary set of allocated memory buffers and an exemplary set of free memory buffers included in an operating system kernel.

As a specific example, lists 212 and/or 214 may identify and/or correspond to a configuration of allocated and free memory buffers as represented by an exemplary system 400 in FIG. 4. As illustrated in FIG. 4, system 400 may include and/or represent an operating system kernel 402 running on network device 206. In one example, operating system kernel 402 may include and/or control a set of allocated memory buffers 404 and/or a set of free memory buffers 406. In this example, allocated memory buffers 404 may include and/or represent memory buffers 122(1), 122(2), 122(3), 122(4), 122(5), 122(6), and/or 122(7). Additionally or alternatively, free memory buffers 406 may include and/or represent memory buffers 122(8) and 122(9).

When functioning properly, operating system kernel 402 may deallocate the memory buffers once their corresponding packets have completed processing and/or been forwarded. Accordingly, operating system kernel 402 may return those deallocated memory buffers to the set of free memory buffers 406 in FIG. 4 and/or indicate that those deallocated memory buffers are available for further allocation via lists 212 and/or 214. Additionally or alternatively, operating system kernel 402 may remove any existing timestamps from the deallocated memory buffers.

Returning to FIG. 3, at step 320 one or more of the systems described herein may identify one or more characteristics of the memory buffer allocated to the packet on the computing device. For example, identification module 104 may, as part of network device 206 in FIG. 2, identify one or more characteristics of memory buffer 122(1) allocated to packet 210(1). Examples of such characteristics include, without limitation, whether the memory buffer is enqueued in a queue of the operating system kernel running on the network device, whether the memory buffer is assigned to a thread of the operating system kernel running on the network device, a timestamp tagged to the memory buffer, the amount of time that the memory buffer has been allocated on the network device, combinations or variations of one or more of the same, and/or any other suitable characteristics of the memory buffer.

The systems described herein may perform step 320 in a variety of ways and/or contexts. In one example, identification module 104 may identify memory buffer 122(1) as being enqueued in a queue of the operating system kernel on network device 206. In another example, identification module 104 may identify memory buffer 122(1) as being assigned to a thread of the operating system kernel on network device 206. In a further example, identification module 104 may identify a timestamp tagged to memory buffer 122(1).

The timestamp may be tagged and/or updated to memory buffer 122(1) in a variety of different ways and/or contexts. For example, timestamp module 110 may tag memory buffer 122(1) with the timestamp at the point in time that the operating system kernel allocates memory buffer 122(1) to packet 210(1). In another example, timestamp module 110 may tag memory buffer 122(1) with the timestamp at the point in time that the operating system kernel assigns memory buffer 122(1) to a thread. In an additional example, timestamp module 110 may tag memory buffer 122(1) with the timestamp at the point in time that memory buffer 122(1) is enqueued in a queue of the operating system kernel.

In one example, timestamp module 110 may update the time indicated by the timestamp as memory buffer 122(1) is assigned a thread of the operating system kernel. In another example, timestamp module 110 may update the time indicated by the timestamp as memory buffer 122(1) is enqueued in a queue of the operating system kernel. Additionally or alternatively, timestamp module 110 may update the time indicated by the timestamp when packet 210(1) of memory buffer 122(1) is processed and/or forwarded.

In one example, identification module 104 may identify the amount of time that memory buffer 122(1) has been allocated on network device 206. For example, identification module 104 may compare the time indicated by the timestamp to the current system time of network device 206. Additionally or alternatively, identification module 104 may create and/or generate a time differential and/or delta that represents the amount of time since the timestamp was tagged and/or updated to memory buffer 122(1).

Figure 5:
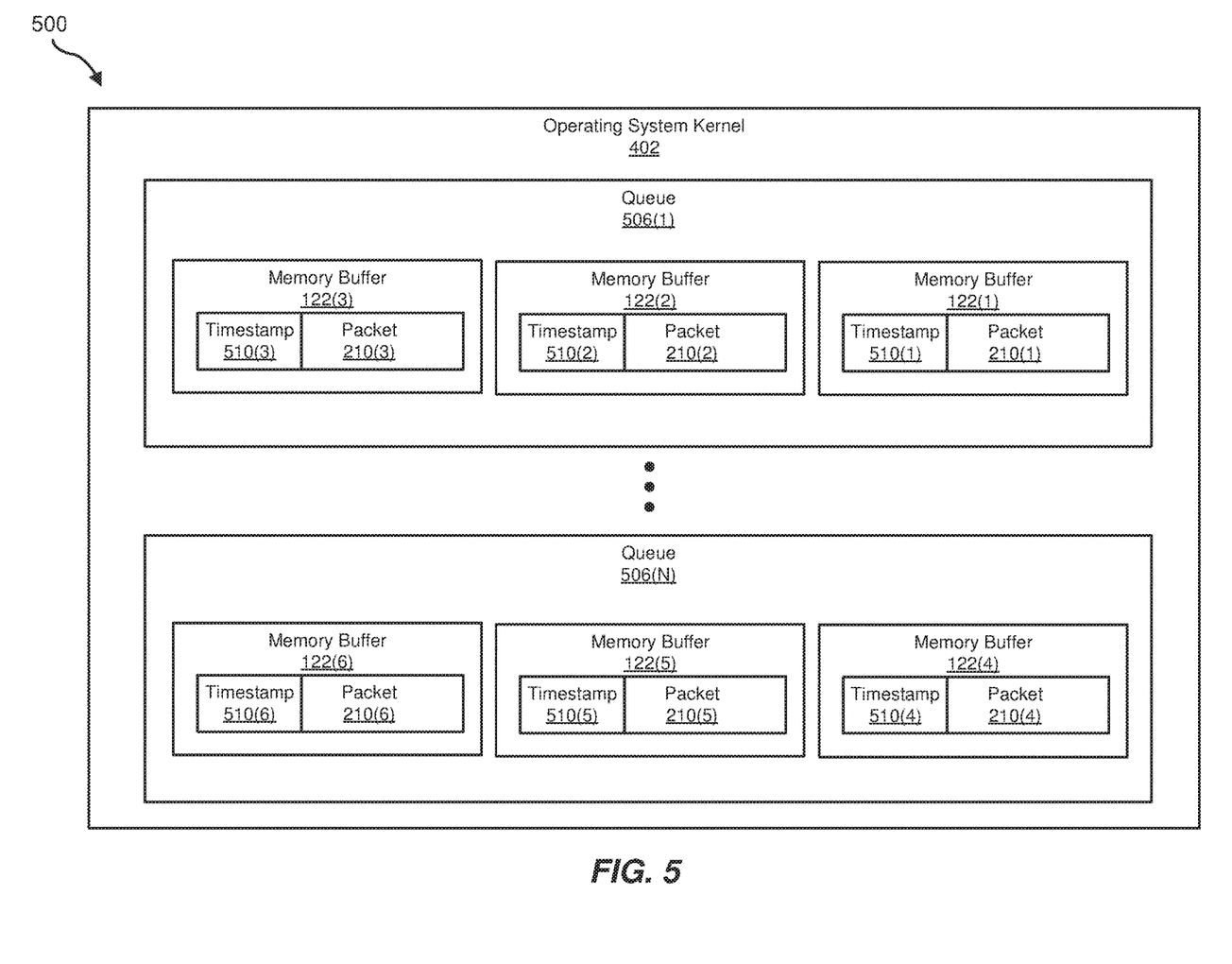
FIG. 5 is an illustration of an exemplary set of memory buffers enqueued in a set of queues included in an operating system kernel.

As a specific example, FIG. 5 illustrates an exemplary system 500 that includes and/or represents various components of operating system kernel 402. As illustrated in FIG. 5, operating system kernel 402 may include and/or control queues 506(1)-(N) managed and/or controlled by operating system kernel 402. In one example, memory buffers 122(1)-(3) may be enqueued and/or loaded in queue 506(1), and memory buffers 122(4)-(6) may be enqueued and/or loaded in queue 506(N). Examples of queues 506(1)-(N) include, without limitation, kernel network dispatch queues (e.g., "netisr" queues), reassembly queues, socket queues, combinations or variations of one or more of the same, and/or any other suitable queues.

As illustrated in FIG. 5, memory buffers 122(1)-(3) may be allocated and/or assigned to packets 210(1), 210(2), and 210(3), respectively. Additionally or alternatively, memory buffers 122(4)-(6) may be allocated and/or assigned to packets 210(4), 210(5), and 210(6), respectively. In one example, timestamp module 110 may tag memory buffers 122(1)-(3) with timestamps 510(1), 510(2), and 510(3), respectively. In this example, timestamp module 110 may tag memory buffers 122(4)-(6) with timestamps 510(4), 510(5), and 510(6), respectively. Timestamp module 110 may also update timestamps 510(1)-(6) as memory buffers 122(1)-(6), respectively, enter and/or are enqueued in queue 506(1) or 506(N).

Figure 6:
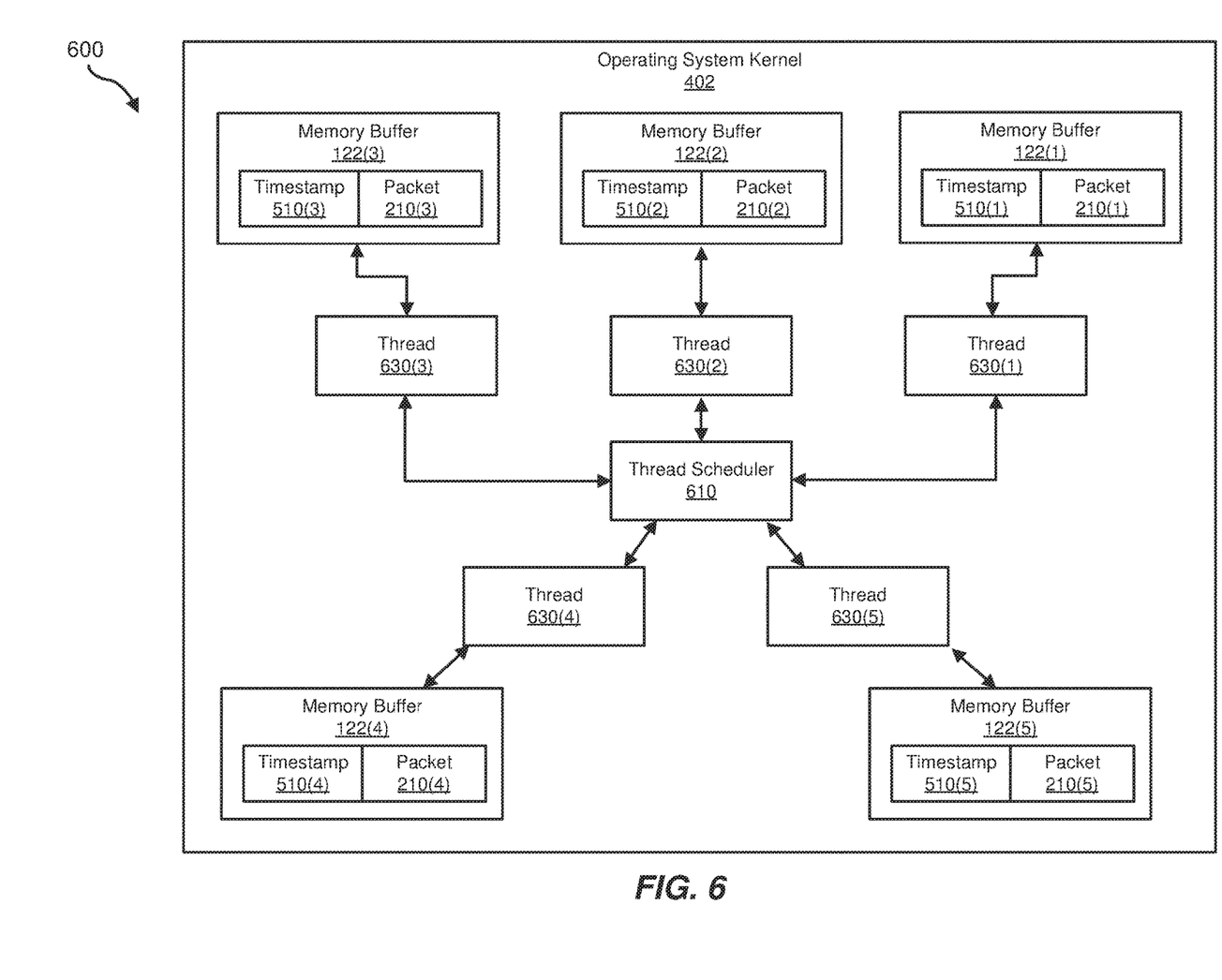
FIG. 6 is an illustration of an exemplary set of memory buffers carrying packets in flight across an operating system kernel.

As another example, FIG. 6 illustrates an exemplary system 600 that includes and/or represents various components of operating system kernel 402. As illustrated in FIG. 6, operating system kernel 402 may include and/or implement a thread scheduler 610 that schedules, handles, applies, and/or assigns threads 630(1), 630(2), 630(3), 630(4), and/or 630(5). In one example, timestamp module 110 may tag memory buffers 122(1)-(5) with timestamps 510(1)-(5), respectively, as memory buffers 122(1)-(5) are allocated to packets 210(1)-(5), respectively. Additionally or alternatively, timestamp module 110 may update timestamps 510(1)-(5) as memory buffers 122(1)-(5) are assigned to threads 630(1)-(5), respectively. Memory buffers 122(1)-(5) in FIG. 6 may constitute and/or represent in-flight or in-transit memory buffers and/or packets, as opposed to enqueued memory buffers and/or packets.

Returning to FIG. 3, at step 330 one or more of the systems described herein may determine, based at least in part on the characteristics of the memory buffer, that the memory buffer allocated to the packet has leaked. For example, determination module 106 may, as part of network device 206 in FIG. 2, determine that memory buffer 122(1) allocated to packet 210(1) has leaked. In one example, the leak of memory buffer 122(1) may occur when the operating system kernel running on network device 206 fails to free and/or release memory buffer 122(1) despite the completion of the processing and/or forwarding of packet 210(1). In other words, the leak of memory buffer 122(1) may constitute and/or represent a type of memory or resource leak in which the operating system kernel running on network device 206 inadvertently maintains and/or keeps memory buffer 122(1) allocated due to a programming error.

The systems described herein may perform step 330 in a variety of ways and/or contexts. In some examples, determination module 106 may determine that memory buffer 122(1) allocated to packet 210(1) has been enqueued in a queue of the operating system kernel running on network device 206. In one example, determination module 106 may detect an amount of time that memory buffer 122(1) has been enqueued in the queue of the operating system kernel. For example, timestamp module 110 may tag memory buffer 122(1) with a timestamp as memory buffer 122(1) enters the queue. In this example, determination module 106 may determine the amount of time that memory buffer 122(1) has been enqueued based at least in part on the timestamp and the current system time. Determination module 106 may determine that the amount of time that memory buffer 122(1) has been enqueued in the queue exceeds a certain time threshold.

In some examples, determination module 106 may determine that memory buffer 122(1) allocated to packet 210(1) has been assigned to a thread of the operating system kernel running on network device 206. In one example, determination module 106 may detect an amount of time that memory buffer 122(1) has been assigned to the thread of the operating system kernel. For example, timestamp module 110 may tag memory buffer 122(1) with a timestamp as memory buffer 122(1) is assigned to the thread. In this example, determination module 106 may determine the amount of time that memory buffer 122(1) has been assigned to the thread based at least in part on the timestamp and the current system time. Determination module 106 may determine that the amount of time that memory buffer 122(1) has been assigned to the thread exceeds a certain time threshold.

In some examples, determination module 106 may use queue and/or thread statistics to determine that one or more of memory buffers 122(1)-(N) has leaked. In one example, determination module 106 may determine, based at least in part on the analysis of list 212 and/or list 214, that the number of memory buffers that are free on network device 206 is below a certain minimum threshold. In this example, determination module 106 may determine that network device 206 is at risk for memory buffer leaks and/or exhaustion due at least in part to the number of memory buffers free on network device 206 being below the certain minimum threshold. Additionally or alternatively, determination module 106 may determine that memory buffer 122(1) has leaked based at least in part on the characteristics of memory buffer 122(1) in view of network device 206 being at risk for memory buffer leaks and/or exhaustion.

In some examples, determination module 106 may determine that the number of free memory buffers identified in list 214 is trending downward. Additionally or alternatively, determination module 106 may determine that the number of allocated memory buffers identified in list 212 is trending upward. In one example, determination module 106 may determine that network device 206 is at risk for memory buffer leaks and/or exhaustion due at least in part to such trends. Additionally or alternatively, determination module 106 may determine that the leak of memory buffer 122(1) has contributed to the number of free memory buffers on network device 206 falling below a certain minimum threshold.

In some examples, if network device 206 is at risk for memory buffer leaks and/or exhaustion, one or more of modules 102 may initiate and/or undertake an investigation and/or examination of potential memory buffer leaks and/or exhaustion on network device 206. In other words, in response to the determination that network device 206 is at risk, one or more of modules 102 may perform certain steps and/or measures described herein in connection with detecting and/or remedying memory buffer leaks or exhaustion. Alternatively, one or more of modules 102 may perform certain steps and/or measures described herein in connection with detecting and/or remedying memory buffer leaks or exhaustion at periodic runtime intervals.

In some examples, determination module 106 may determine that memory buffer 122(1) is not currently assigned to any thread of the operating system kernel running on network device 206. In such examples, determination module 106 may also determine that memory buffer 122(1) is not currently enqueued in any queue of the operating system kernel running on the network device 206. Determination module 106 may then determine that memory buffer 122(1) has leaked based at least in part on (1) memory buffer 122(1) not being currently assigned to any thread of the operating system kernel and (2) memory buffer 122(1) not being currently enqueued in any queue of the operating system kernel.

Returning to FIG. 3, at step 340 one or more of the systems described herein may perform at least one action to remedy the leak of the memory buffer in response to the determination that the memory buffer has leaked. For example, remedy module 108 may, as part of network device 206 in FIG. 2, perform at least one action to remedy the leak of memory buffer 122(1). In this example, remedy module 108 may initiate the performance of this action in response to the determination that memory buffer 122(1) has leaked. Examples of such actions include, without limitation, freeing or releasing leaked memory buffers, notifying an administrator of leaked memory buffers or potential memory buffer exhaustion, notifying a policy engine of leaked memory buffers, performing a graceful switchover to a redundant or backup device, collecting and/or delivering metadata and/or memory data related to allocated and/or free memory buffers, combinations or variations of one or more of the same, and/or any other suitable remedying actions.

The systems described herein may perform step 340 in a variety of ways and/or contexts. In one example, remedy module 108 may free, release, and/or deallocate memory buffer 122(1) to increase the number of free memory buffers on network device 206. In another example, remedy module 108 may notify an administrator that manages network device 206 of the leak of memory buffer 122(1) to initiate and/or facilitate remedying the leak. In a further example, remedy module 108 may notify a policy engine 216 on network device 206 of the leak of memory buffer 122(1) to initiate and/or facilitate remedying the leak.

In an additional example, remedy module 108 may initiate and/or perform a graceful switchover from network device 206 to a redundant or backup device such that traffic is redirected from network device 206 to the redundant or backup device. Additionally or alternatively, remedy module 108 may collect and/or gather metadata and/or memory data related to allocated and/or free memory buffers. Remedy module 108 may then deliver and/or provide the metadata and/or memory data to an administrator and/or debug engine for the purpose of debugging and/or diagnosing the underlying cause of the memory buffer leakage. By delivering and/or providing the metadata and/or memory data in this way, remedy module 108 may initiate and/or facilitate the identification of the faulty path (most likely an exception path, as opposed to a regular path) and/or debugging or resolving that faulty path to remedy the memory buffer leakage. Examples of such metadata and/or memory data include, without limitation, packet headers, ingress and/or egress interfaces, Time-To-Live (TTL) values, combinations or variations of one or more of the same, and/or any other suitable metadata or memory data.

As described above in connection with FIGS. 1-6, the various apparatuses, systems, and methods described herein may be able to detect and/or remedy memory buffer leaks in network devices before such leaks lead to and/or cause memory buffer exhaustion. For example, memory buffer leaks may cause stalls and/or crashes on network devices. If left untreated, these leaks may ultimately render the network devices inoperable and/or unusable due to memory buffer exhaustion.

To detect and/or remedy these leaks in advance of memory buffer exhaustion, the various apparatuses, systems, and methods described herein may carry out a series of steps and/or measures. For example, an operating system kernel running on a network device may allocate memory buffers to packets handled and/or forwarded by the network device. These allocated memory buffers may be enqueued in queues of the operating system kernel and/or owned by threads of the operating system kernel. The operating system kernel may use queue and/or thread statistics or counters to determine and/or identify which, if any, allocated memory buffers have leaked and/or which, if any, exception paths led to the memory buffer leaks.

In some examples, an investigation and/or examination of potential memory buffer leaks and/or exhaustion may be triggered and/or launched if the number of free memory buffers falls below a certain minimum threshold. For example, the operating system kernel may monitor the number of memory buffers that are free and/or available for allocation to incoming packets. If the number of free memory buffers falls below the certain minimum threshold, the operating system kernel may initiate and/or undertake an investigation and/or examination of potential memory leaks and/or exhaustion on the network device.

Upon confirming the presence of memory buffer leaks and/or the potential for memory buffer exhaustion, the operating system kernel may perform one or more actions to address the problem(s). For example, the operating system kernel may initiate a graceful switchover and/or failover from the network device to a backup device. Additionally or alternatively, the operating system kernel may collect and/or deliver metadata of the memory buffers to facilitate and/or support identifying and debugging exception paths that lead to the memory buffer leakage.

Figure 7:
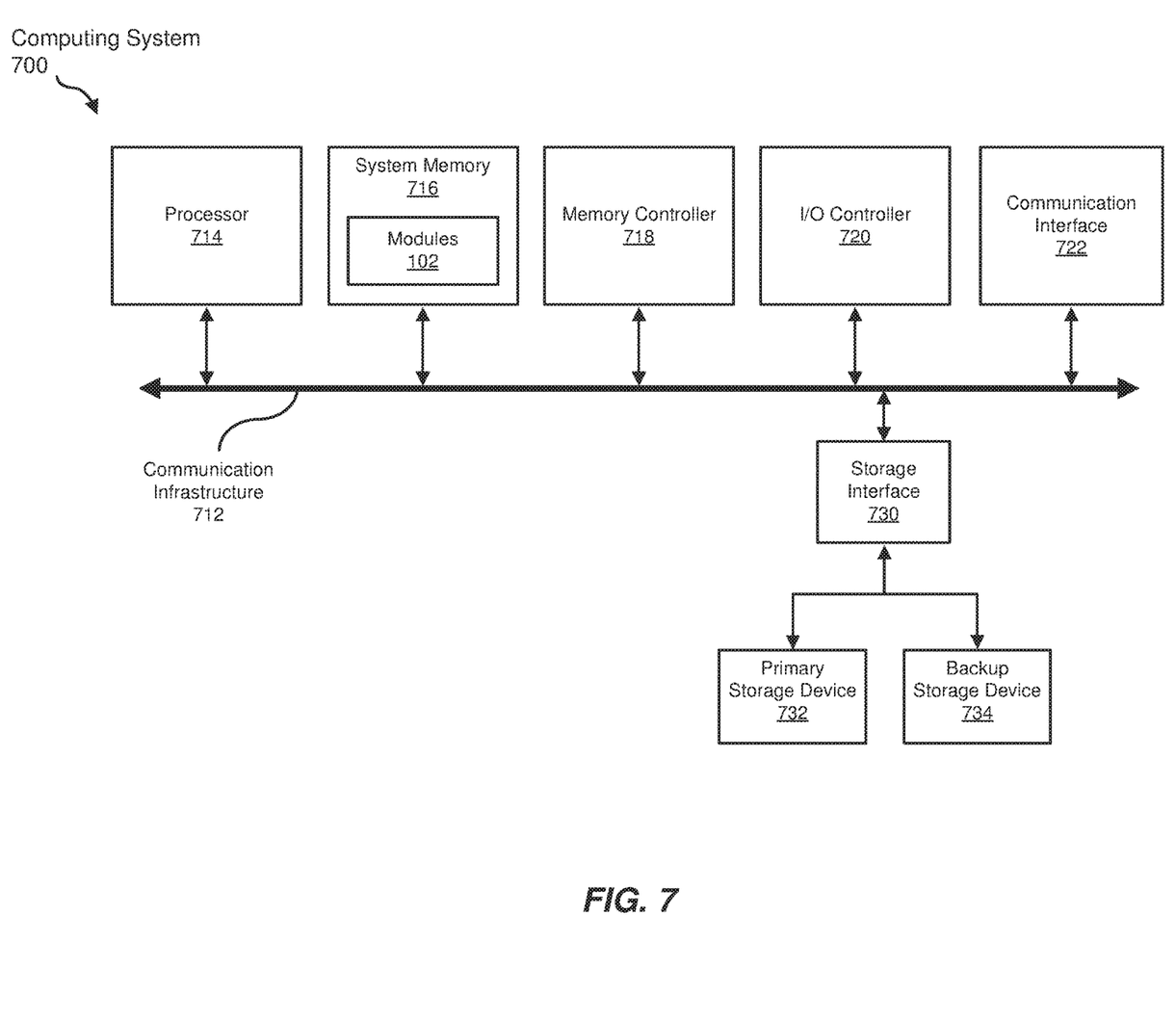
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a plurality of memory buffers that are allocated to packets on a computing device, wherein the plurality of memory buffers includes:
     one or more memory buffers that are in-flight on the computing device; and
     one or more memory buffers that are enqueued in kernel network dispatch queues of an operating system kernel running on the computing device;
   identifying one or more characteristics of a first memory buffer included in the plurality of memory buffers, wherein identifying the characteristics of the first memory buffer comprises:
     determining that the first memory buffer has been enqueued in a kernel network dispatch queue of an operating system kernel running on the computing device; and
     detecting an amount of time that the first memory buffer has been enqueued in the kernel network dispatch queue of the operating system kernel;
   determining that the amount of time that the first memory buffer has been enqueued in the kernel network dispatch queue exceeds a certain threshold;
   determining that the first memory buffer has leaked based at least in part on the amount of time that the first memory buffer has been enqueued in the kernel network dispatch queue exceeding the certain threshold; and
   in response to determining that the first memory buffer has leaked, performing at least one action to remedy the leak of the first memory buffer.

2. The method of claim 1, wherein identifying the plurality of memory buffers comprises:
   analyzing a list of memory buffers that are currently allocated on the computing device; and
   during the analysis, locating the first memory buffer on the list of memory buffers.

3. The method of claim 1, further comprising:
   analyzing a list of memory buffers that are free on the computing device;
   determining, based at least in part on the analysis, that the number of memory buffers identified in the list is below a specific threshold; and
   determining that the computing device is at risk for memory buffer leaks due at least in part to the number of memory buffers identified in the list being below the specific threshold; and
   wherein determining that the first memory buffer has leaked comprises determining that the first memory buffer has leaked based at least in part on the characteristics of the first memory buffer and the computing device being at risk for memory buffer leaks.

4. The method of claim 3, wherein determining that the number of memory buffers identified in the list is below the specific threshold comprises at least one of:
   determining that the number of memory buffers identified in the list is trending downward; and
   determining that another list of memory buffers that are currently allocated on the computing device is trending upward.

5. The method of claim 1, wherein detecting the amount of time that the first memory buffer has been enqueued in the kernel network dispatch queue comprises:
   tagging the first memory buffer with a timestamp as the first memory buffer enters the kernel network dispatch queue; and
   determining, based at least in part on the timestamp, that the first memory buffer has been enqueued for the amount of time.

6. The method of claim 1, wherein:
   identifying the characteristics of the first memory buffer on the computing device comprises:
     determining that the first memory buffer has been assigned to a thread of the operating system kernel running on the computing device; and
     detecting an amount of time that the first memory buffer has been assigned to the thread of the operating system kernel; and
   determining that the first memory buffer has leaked comprises determining that the amount of time that the first memory buffer has been assigned to the thread exceeds a specific threshold.

7. The method of claim 6, wherein detecting the amount of time that the first memory buffer has been assigned to the thread comprises:
   tagging the first memory buffer with a timestamp as the first memory buffer is assigned to the thread; and
   determining, based at least in part on the timestamp, that the first memory buffer has been assigned to the thread for the amount of time.

8. The method of claim 1, wherein:
   determining that the first memory buffer has leaked comprises determining that the leak of the first memory buffer has contributed to the number of free memory buffers on the computing device falling below a specific threshold; and
   the action performed to remedy the leak of the first memory buffer comprises freeing the first memory buffer to increase the number of free memory buffers on the computing device.

9. The method of claim 1, wherein:
   determining that the first memory buffer has leaked comprises determining that the leak of the first memory buffer has contributed to the number of free memory buffers on the computing device falling below a specific threshold; and
   the action performed to remedy the leak of the first memory buffer comprises at least one of:
     notifying an administrator of the leak of the first memory buffer to initiate remedying the leak of the first memory buffer; and
     notifying a policy engine on the computing device of the leak of the first memory buffer to initiate remedying the leak of the first memory buffer.

10. The method of claim 1, wherein:
    identifying the characteristics of the first memory buffer comprises:

determining that the first memory buffer is not currently assigned to any thread of the operating system kernel running on the computing device; and
determining that the first memory buffer is not currently enqueued in any kernel network dispatch queue of the operating system kernel running on the computing device;
determining that the first memory buffer has leaked comprises determining that the first memory buffer has leaked based at least in part on:
the first memory buffer not being currently assigned to any thread of the operating system kernel; and
the first memory buffer not being currently enqueued in any kernel network dispatch queue of the operating system kernel.

11. A system comprising:
an identification module, stored in memory, that:
identifies a plurality of memory buffers that are allocated to packets on a computing device, wherein the plurality of memory buffers includes:
one or more memory buffers that are in-flight on the computing device; and
one or more memory buffers that are enqueued in kernel network dispatch queues of an operating system kernel running on the computing device;
identifies one or more characteristics of a first memory buffer included in the plurality of memory buffers, wherein identifying the characteristics of the first memory buffer comprises:
determining that the first memory buffer has been enqueued in a kernel network dispatch queue of an operating system kernel running on the computing device; and
detecting an amount of time that the first memory buffer has been enqueued in the kernel network dispatch queue of the operating system kernel;
a determination module, stored in memory, that:
determines that the amount of time that the first memory buffer has been enqueued in the kernel network dispatch queue exceeds a certain threshold; and
determines that the first memory buffer has leaked based at least in part on the amount of time that the first memory buffer has been enqueued in the kernel network dispatch queue exceeding the certain threshold; and
a remedy module, stored in memory, that performs at least one action to remedy the leak of the first memory buffer in response to the determination that the first memory buffer has leaked; and
at least one physical processor configured to execute identification module, the determination module, and the remedy module.

12. The system of claim 11, wherein, to identify the first memory buffer, the identification module:
analyzes a list of memory buffers that are currently allocated on the computing device; and
locates, during the analysis, the first memory buffer on the list of memory buffers.

13. The system of claim 11, wherein:
the identification module analyzes a list of memory buffers that are free on the computing device;
the determination module:
determines, based at least in part on the analysis, that the number of memory buffers identified in the list is below a specific threshold;
determines that the computing device is at risk for memory buffer leaks due at least in part to the number of memory buffers identified in the list being below the specific threshold; and
determines that the first memory buffer has leaked based at least in part on the characteristics of the first memory buffer and the computing device being at risk for memory buffer leaks.

14. The system of claim 13, wherein, to determine that the number of memory buffers identified in the list is below the specific threshold, the determination module:
determines that the number of memory buffers identified in the list is trending downward; or
determines that another list of memory buffers that are currently allocated on the computing device is trending upward.

15. The system of claim 11, further comprising:
a timestamp module, stored in memory, tags the first memory buffer with a timestamp as the first memory buffer enters the kernel network dispatch queue; and
wherein the determination module determines, based at least in part on the timestamp, that the first memory buffer has been enqueued for the amount of time.

16. The system of claim 11, wherein the determination module:
determines that the first memory buffer has been assigned to a thread of the operating system kernel running on the computing device; and
detects an amount of time that the first memory buffer has been assigned to the thread of the operating system kernel; and
determines that the first memory buffer has leaked comprises determining that the amount of time that the first memory buffer has been assigned to the thread exceeds a specific threshold.

17. The system of claim 16, further comprising:
a timestamp module, stored in memory, tags the first memory buffer with a timestamp as the first memory buffer is assigned to the thread; and
wherein the determination module determines, based at least in part on the timestamp, that the first memory buffer has been assigned to the thread for the amount of time.

18. An apparatus comprising:
at least one storage device that includes a set of memory buffers available for allocation to packets traversing a computing device;
at least one physical processor communicatively coupled to the storage device, wherein the physical processor:
identifies a plurality of memory buffers that are allocated to packets on a computing device, wherein the plurality of memory buffers includes:
one or more memory buffers that are in-flight on the computing device; and
one or more memory buffers that are enqueued in kernel network dispatch queues of an operating system kernel running on the computing device;
identifies one or more characteristics of a first memory buffer included in the plurality of memory buffers, wherein identifying the characteristics of the first memory buffer comprises:
determining that the first memory buffer has been enqueued in a kernel network dispatch queue of an operating system kernel running on the computing device; and detecting an amount of time that the first memory buffer has been enqueued in the kernel network dispatch queue of the operating system kernel;

determines that the amount of time that the first memory buffer has been enqueued in the kernel network dispatch queue exceeds a certain threshold;

determines that the first memory buffer has leaked based at least in part on the amount of time that the first memory buffer has been enqueued in the kernel network dispatch queue exceeding the certain threshold; and performs at least one action to remedy the leak of the first memory buffer in response to the determination that the first memory buffer has leaked.

* * * * *